A. K. GYZANDER.
METHOD OF MANUFACTURING SODIUM HYDROSULFITE.
APPLICATION FILED APR. 14, 1917.
Patented June 18, 1918.
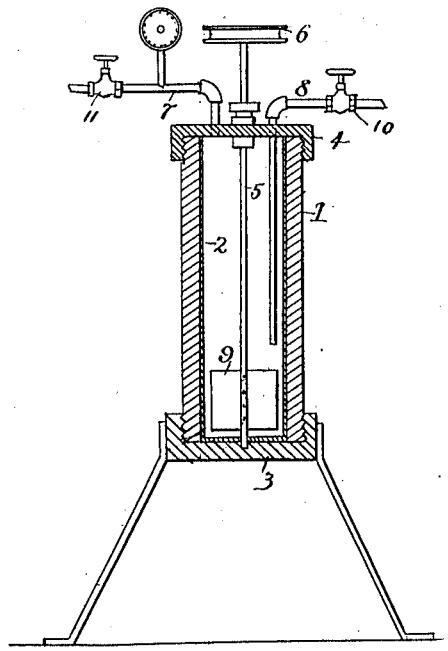
Inventor:
Arne K. Gyzander
by S. W. Bates
Atty.

UNITED STATES PATENT OFFICE.

ARNE K. GYZANDER, OF WESTBROOK, MAINE.

METHOD OF MANUFACTURING SODIUM HYDROSULFITE.

1,270,150.　　　Specification of Letters Patent.　　Patented June 18, 1918.

Application filed April 14, 1917. Serial No. 161,952.

*To all whom it may concern:*

Be it known that I, ARNE K. GYZANDER, a citizen of the United States, residing at Westbrook, in the county of Cumberland and State of Maine, have invented certain new and useful Improvements in Methods of Manufacturing Sodium Hydrosulfite, of which the following is a specification.

My invention relates to the manufacture of sodium hydrosulfite, a substance which is extensively used in the dyeing industry.

This substance has hitherto been commonly made of sodium bisulfite by the use of zinc in which process, there is a very considerable loss of zinc and bisulfite, making the process an expensive one.

The object of my invention is to make a pure product by a relatively cheap, simple and easily operated method by the use of hydrogen gas. This gas may be generated cheaply by the electrolytic decomposition of water, where cheap power can be obtained.

My process is founded on the fact that aqueous solutions of sulfurous acid, or its salts, when acted upon by hydrogen gas under pressure, and at ordinary temperature are reduced to hydrosulfurous acid and salts of the same, the basis of the reaction being the effect of the hydrogen gas on the acid, independent of the base with which the acid is combined.

The formula for this reaction is as follows:

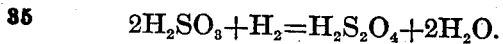

The process, as carried out in practice for the production of sodium hydrosulfite, consists of subjecting a solution of sodium sulfite to hydrogen gas, under pressure and stirring or agitating the solution, while subjected to the action of the hydrogen.

The result is the conversion of the sulfite into hydrosulfite with the following reaction:

or in other words, when the sulfite is acted upon by hydrogen, the product is hydrosulfite and caustic soda.

It is found that the velocity of the reaction is proportional to the pressure of the hydrogen.

Thus, with the pressure of the hydrogen, 100 lbs. per sq. in., the time required to produce a 95% conversion will be 352 hours with continual stirring of the solution.

With the pressure of 1456 lbs. per sq. in. on the hydrogen, the time required would be 24 hours.

The hydrosulfite being in the form of an aqueous solution, it may be reduced to a dry powder by any well known method.

In the accompanying drawing, I have shown an apparatus, in simple form, capable of carrying out this process, although other forms may be used.

In the drawing, 1 represents a tight cylinder capable of resisting a heavy pressure in which the sulfite solution is placed and 2 is a lead cup or lining.

The cylinder has a tight cup or cover 4 a base 3 and a stirrer 9 on the lower end of a shaft 5 with a pulley 6 for rotating the shaft.

Connected with the cylinder is a pipe 7 through which hydrogen gas, under pressure may be pumped or otherwise conveyed to the cylinder.

An outlet pipe 8 has a valve 10 for controlling it and a valve 11 controls the inlet pipes 7.

In carrying out the process, the sulfite solution is placed in the tank 1, the hydrogen is admitted under pressure through the pipe 7 and the solution is stirred through the action of the rotating stirrer. The stirring tends to bring the gas and solution into intimate contact and to hasten the reaction.

The air should be exhausted from the cylinder before the hydrogen is admitted.

The stirring is continued in contact with the compressed hydrogen until the conversion of the sulfite is complete or until the process is finished.

The process may be applied to any soluble salts of sulfurous acid as sodium bisulfite, etc., and it is immaterial whether they be normal or acid.

The apparatus which I have illustrated may be modified in any desired manner to produce the result indicated. If the cylinder is of iron or steel, it should be lined as indicated with lead or other metal which will not be attacked by the sulfite.

I claim:

The process of converting salts of sulfurous acid, into hydrosulfites, which consists in subjecting them to the action of hydrogen gas, under pressure.

In testimony whereof I hereby affix my signature.

ARNE K. GYZANDER.